United States Patent [19]

Parker

[11] 3,737,779

[45] June 5, 1973

[54] PULSE TRAIN PROCESSING SYSTEM WITH DISCRIMINATION AGAINST NOISE FOR USE WITH PULSE WIDTH MODULATION

[75] Inventor: Norman W. Parker, Wheaton, Ill.

[73] Assignee: Motorola, Inc., Franklin Park, Ill.

[22] Filed: June 29, 1972

[21] Appl. No.: 267,663

[52] U.S. Cl. .............325/324, 179/15 AW, 325/322, 325/476, 328/112, 329/106

[51] Int. Cl. ..............................................H04b 1/10

[58] Field of Search .....................179/15 AE, 15 AN, 179/15 AW; 325/321–326, 473–477; 328/109, 111, 112, 164; 329/106; 178/DIG. 12

[56] References Cited

UNITED STATES PATENTS 2,525,634 10/1950 Atwood et al...................179/15 AW

*Primary Examiner*—Albert J. Mayer
*Attorney*—Foorman L. Mueller, George Aichele, James W. Gillman

[57] ABSTRACT

System for separating pulses containing information in a pulse width modulated pulse train, wherein the leading edges of the pulses occur at a fixed repetition rate. Noise which occurs on the leading edge of the pulses is reduced by slicing the fixed position leading edges. A gating wave stabilized by the received pulse train, and which is insensitive to wide band noise, opens a gate for the pulses after the leading edge of each pulse, and closes the gate before the leading edge of the next pulse. A plurality of gates can be provided to separate pulse trains which are multiplexed to form a composite pulse train. The gates do not affect the pulse width modulation represented by the position of the lagging edges of the pulses and reduces the noise accompanying the demodulated signals.

8 Claims, 2 Drawing Figures

Patented June 5, 1973 3,737,779

PULSE TRAIN PROCESSING SYSTEM WITH DISCRIMINATION AGAINST NOISE FOR USE WITH PULSE WIDTH MODULATION

BACKGROUND OF THE INVENTION

Pulse width modulation is used in many applications to transmit information, and has the advantage that the pulse amplitude remains fixed and can be restored after transmission by a media which acts to change the amplitude. Noise which appears as amplitude modulation of the pulses can be removed, but noise may occur to alter the leading and lagging edges of the pulses. In the detection process, the width of the pulses may be detected by integration or other means to derive the information therefrom. This detection responds to the noise on the leading and lagging edges of the pulses, to cause undesired noise to be produced with the desired information signal.

In some systems, pulse trains are multiplexed whereby pulses of one pulse train providing one piece of information are interspersed with pulses of other pulse trains providing one or more other pieces of information. In such systems, the pulses are separated into individual pulse trains prior to detection, as by gating out the pulses of each individual pulse train from the composite pulse trains. One example of such a system is known as the EVR system for producing color pictures wherein color information is provided as first and second pulse trains, with the pulse of the two trains being interspersed in a composite pulse train. The composite pulse train may be recorded for storage, and during the processes involved in recording and reproducing noise may be added to the pulses causing interference in the reproduced pictures. Such a system is disclosed in may prior patent application Ser. No. 210,098, filed Dec. 20, 1971, which is a continuation of application Ser. No. 8,947, filed Feb. 5, 1970.

SUMMARY OF THE INVENTION

It is an object of the present invention to provide a system for removing noise from pulses in a pulse width modulated pulse train, prior to detection thereof.

Another object of the invention is to provide a system for separating pulses of one pulse train from a composite pulse train, wherein pulses of a plurality of pulse trains are interspersed (multiplexed), which removes noise from the leading edges of the pulses in the separation process.

A further object of the invention is to provide a system for removing noise from pulse width modulated pulses, wherein the pulses have leading edges occurring at a fixed repetition rate, which includes a gate for slicing the leading edges of the pulses to remove noise therefrom.

In accordance with the invention, two individual pulse trains are separated from a multiplexed composite pulse train which has leading edges occurring at a fixed repetition rate. The pulses have widths which vary with the information modulated thereon. A pair of gates separate out the two individual pulse trains, with the gate for separating out each pulse train opening after the leading edges of the pulses thereof to thereby slice the leading edges and remove noise therefrom. The gate closes prior to the leading edge of the next pulse, at a time following the lagging edge of the widest pulse which is produced by the modulation. The gates are controlled by an oscillator which is stabilized by the pulse wave, with the oscillator output being shifted in phase, clipped and inverted to control flip-flop circuits which in turn control the gates.

DETAILED DESCRIPTION

Figures 1, 2:
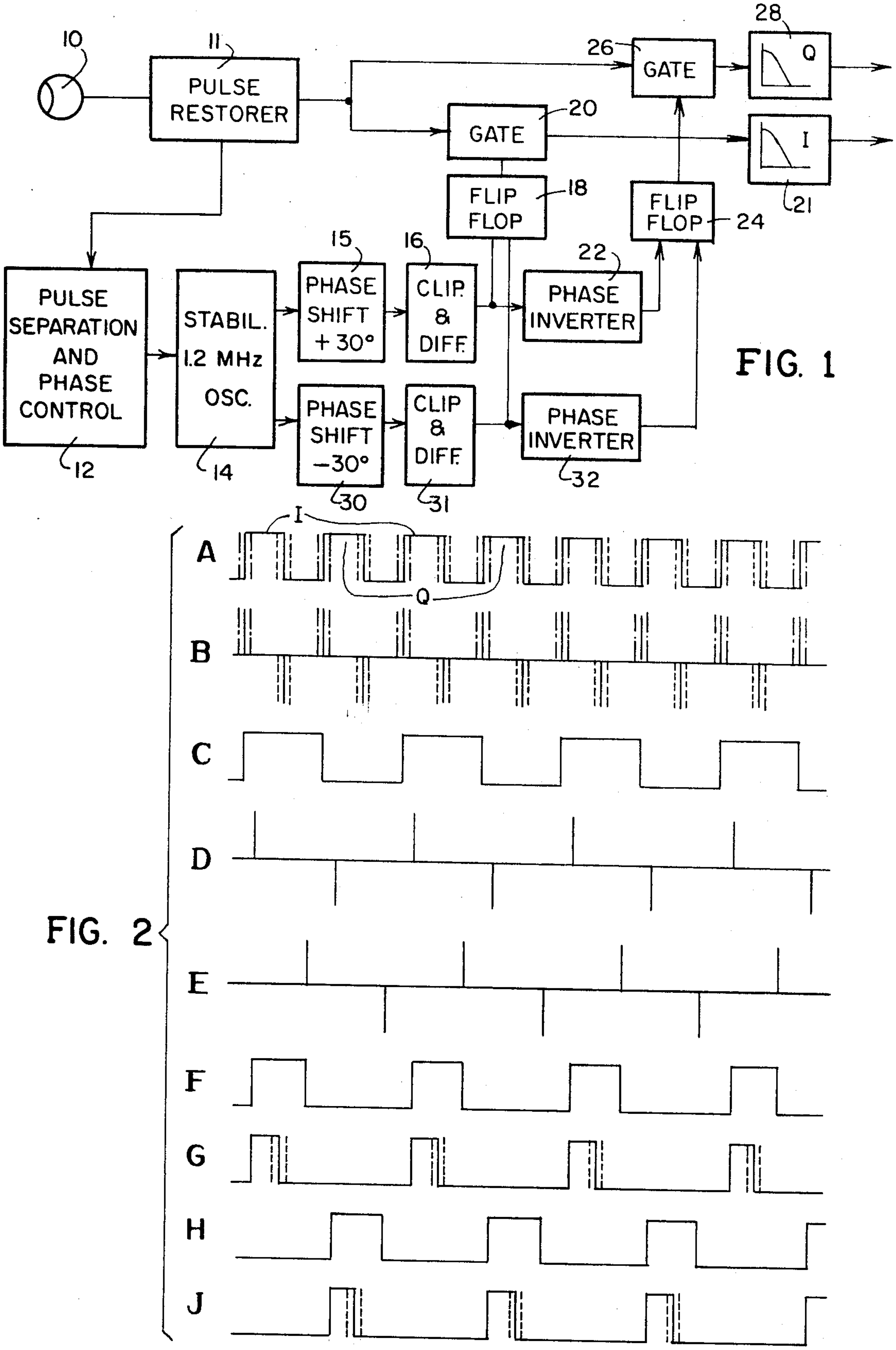
FIG. 1 is a block diagram of the noise reducing system of the invention.
FIG. 2 illustrates pulse waveforms occurring in the system.

In FIG. 1, the pulses of a pulse train from source 10 are applied to pulse restorer 11 which restores the shape of the pulses. The source 10 can be a communication channel of any kind, or a pick up head deriving signals from some storage medium, such as photographic or magnetic tape. In the EVR system which has been mentioned, signals are derived from a photographic tape. Pulses from the restorer 11 are applied to a phase control circuit 12 which controls the phase of a rectangular base oscillator 14. The oscillator operates at a repetition rate one half that of the pulses, which may be 1.2 megahertz. The phase control 12 is substantially immune to noise, and stabilizes the oscillator 14 so that it is held in phase with the incoming pulses.

The output of the oscillator 14 is applied to phase shift circuit 15 which produces a rectangular wave delayed with respect to the wave from the oscillator 14 by 30°. This pulse wave is clipped and differentiated by circuit 16 to produce short pulses which trigger the flip-flop circuit 18. The circuit 18 operates gate 20 to which the pulse train is applied by the pulse restorer 11. The output of oscillator 14 is applied to a second phase shift circuit 30 which produces a pulse wave lagging the pulse wave from the oscillator 14 by 30°. The pulse wave from phase shifter 30 is clipped and differentiated by circuit 31, and the output is applied as the reset output to flip-flop circuit 18 which controls gate 20. The pulses passed by gate 20 are applied to circuit 21 which detects and processes the pulses which may include the I channel information.

The output of clipper and differentiator circuit 16 is also applied to phase inverter 22 which applies pulses to trigger flip-flop circuit 24 which controls gate 26, to which the pulse train is also applied. The output of clipper and differentiator circuit 31 is also applied to phase inverter 32 which provides the reset input to the flip-flop circuit 24 which controls gate 26. The pulses applied through gate 26 are passed to circuit 28 which detects and processes the Q channel information. The pulses applied to circuit 21 will be the pulses of one pulse train, with the front edges sliced, and the pulses applied to circuit 28 will be the pulses of the second interspersed pulse train, with the front edges sliced.

For an understanding of the circuit of FIG. 1, reference is made to the waveforms of FIG. 2. Line A of FIG. 2 shows the multiplexed composite pulse train in which the first, third, fifth, etc. pulses provide one information signal, which is designated I, and the second, fourth, sixth, etc. pulses form a second pulse train, which is designated Q. It will be noted that the leading edges of the pulses have dot-dash lines on either side thereof indicating noise which will be encountered in the system, which acts to modulate the leading edges. The lagging edges of the pulses have dashed lines on either side thereof, representing the limits of the modulation thereof which transmits the information. As previously stated, the information is applied to modulate the width of the pulses in known manner.

Line B of FIG. 2 shows the differentiated signal derived from the pulse train. Positive spikes are produced at the leading edges of the pulse and negative spikes at the lagging edges. The leading edge spikes can be separated and used to develop a pulse wave having a repetition rate one half that of the original pulse train. The action of the noise on the leading edges can be removed by filtering or other know means.

Waveform C of FIG. 2 represents the output of the stabilized oscillator 14 in the system of FIG. 1. Line D shows this rectangular wave which has been shifted ahead by 30° by circuit 15 and differentiated by circuit 16. Similarly, line E shows the wave which lags by 30° by action of phase shifter 30, and has been differentiated by circuit 31.

Line F of FIG. 2 shows the gating wave applied to the gate 20 by the flip-flop 18. The flip-flop 18 is turned on by the positive spike from the clipper and differentiator 16 (line D), and turned off by the positive spike from the clipper and differentiator 31, shown in line E. This gating wave gates out the I pulses from the composite pulse train shown in line A, but as the gating wave is delayed with respect to the pulse wave, the leading edges of the pulses are sliced. Accordingly, the noise appearing on the leading edge is removed therefrom. The gating pulses continue for a time longer than the longest modulated pulses so that the modulation on the lagging edges of the pulses is not disturbed. This is shown by the pulse wave G.

Line H shows the gating wave applied to the gate 26 which gates out the Q pulses from the multiplexed composite pulse train. This gating wave is initiated by the negative spikes from the clipper and differentiator 16, by action of the phase inverter 22 which applies delayed pulses to the flip-flop 24 to initiate the gating wave. The flip-flop 24 is reset by the advanced pulses derived by clipper and differentiator 31 and applied through phase shifter 32. That is, the flip-flop 24 is reset by the negative pulses shown in line E. This gating wave is shown by line H of FIG. 2, and the Q pulses selected thereby are shown by line J. Again the leading edges of the pulses are sliced to remove the noise therefrom, whereas the lagging edges are passed with the full modulation. The selected pulse waves can then be demodulated to provide the information signal, with the noise accompanying the signal being reduced.

The system which has been described is effective to reduce noise in a pulse width modulated signal. The slicing of the leading edges removes the noise therefrom which may be produced by recording, transmission or other handling of the signal. The system is relatively simple and non-critical of adjustment and is suitable for use in many applications.

I claim:

1. A system for decreasing the response to noise appearing in a pulse width modulated pulse train wherein the pulses have leading edges occurring at a fixed repetition rate, and pulse widths which vary with the modulation, such system including in combination:

oscillator means producing a wave having a frequency related to the repetition rate of the pulse train;

phase control means coupling the modulated pulse train to said oscillator means for stabilizing the frequency thereof;

phase shift means coupled to said oscillator means for producing an output wave delayed with respect to the wave from said oscillator means;

means coupled to said phase shift means and responsive to said output wave fro producing a gating pulse train having leading edges delayed with respect to the leading edges of the modulated pulse train; and gating means for receiving said modulated pulse train and responsive to said gating pulse train to slice the leading edges from said modulated pulse train.

2. The system of claim 1 wherein said means for producing a gating pulse train includes a flip-flop circuit.

3. The system of claim 2 including further phase shift means coupled to said oscillator means for producing a wave advanced with respect to the wave from said oscillator means, and means coupled to said further phase shift means for applying pulses to said flip-flop circuit to terminate the pulses of said gating pulse train ahead of the leading edge of the next pulse in the pulse train.

4. A system for separating individual pulse width modulated pulse trains from a composite pulse train including a plurality of multiplexed pulse trains, with the leading edges of the pulses in the composite pulse train occurring at a fixed repetition rate, such system including in combination, oscillator means producing a wave having a frequency related to the repetition rate of the pulses in the composite pulse train, phase control means responsive to the composite pulse train and coupled to said oscillator means for stabilizing the frequency thereof, phase shift means coupled to said oscillator means for producing a gating wave delayed with respect to the wave from said oscillator means, first and second gating means for receiving the modulated pulse train and each responsive to a gating pulse train to selectively pass pulses of said composite pulse train, first circuit means coupled to said phase shift means and to said first gating means for operating said first gating means to pass pulses from one of said individual pulse trains, with the operation of said gating means being delayed with respect to the leading edges of the pulses of the selected pulse train to slice such leading edges, and second circuit means coupled to said phase shift means and to said second gating means for operating said second gating means to pass the pulses from a second individual pulse train with the operation of said second gating means being delayed with respect to the leading edges of the pulses of the selected pulse train to slice such leading edges.

5. The system of claim 4 wherein said oscillator means produces a square wave having a repetition rate which is one-half that of the pulses in the composite pulse train, and said second circuit means includes a phase inverter for operating said second gating means, whereby said first and second gating means operate during opposite half cycles of the gating wave.

6. The system of claim 4 including further phase shift means coupled to said oscillator means for producing a wave advanced with respect to the wave from said oscillator means and wherein said first and second circuit means are coupled to said further phase shift means for operating said gating means to cause the same to pass only the pulses of the selected pulse train.

7. The system of claim 6 wherein said first and second circuit means each includes a flip-flop circuit for providing gating pulses to said first and second gating means, respectively, and including clipper and differentiator circuits for coupling said phase shift means to said flip-flop circuits.

8. The system of claim 7 wherein said oscillator means produces a square wave having a repetition rate one half that of the repetition rate of the pulses in the composite pulse train, and said second circuit means includes phase inverters coupled to said phase shift means for operating said second gating means, with said first and second gating means each passing alternate pulses of said composite pulse train.

* * * * *